United States Patent
Rose et al.

[11] Patent Number: 6,161,865
[45] Date of Patent: Dec. 19, 2000

[54] INTERLOCKING AIRBAG ATTACHMENT AND MODULE ASSEMBLY

[75] Inventors: Larry D. Rose, Layton; Travis Hess, Plain City, both of Utah

[73] Assignee: Autoliv ASP, Inc., Ogden, Utah

[21] Appl. No.: 09/321,937

[22] Filed: May 28, 1999

[51] Int. Cl.⁷ ............................................. B60R 21/20
[52] U.S. Cl. .......................... 280/728.3; 280/728.2; 280/732
[58] Field of Search ............... 280/728.1, 728.2, 280/728.3, 730.2, 732, 731

[56] References Cited

U.S. PATENT DOCUMENTS

| | | |
|---|---|---|
| 5,259,641 | 11/1993 | Schenk et al. . |
| 5,332,256 | 7/1994 | Lauritzen et al. . |
| 5,344,182 | 9/1994 | Lauritzen et al. . |
| 5,395,133 | 3/1995 | Lauritzen et al. . |
| 5,407,226 | 4/1995 | Lauritzen et al. . |
| 5,407,227 | 4/1995 | Lauritzen et al. . |
| 5,511,819 | 4/1996 | Spilker et al. . |
| 5,533,750 | 7/1996 | Karlow et al. . |
| 5,582,423 | 12/1996 | Rion et al. . |
| 5,588,667 | 12/1996 | Emambakhsh et al. . |
| 5,588,669 | 12/1996 | Leonard et al. . |
| 5,605,347 | 2/1997 | Karlow et al. . |
| 5,639,112 | 6/1997 | Phillion et al. . |
| 5,676,390 | 10/1997 | Olson . |
| 5,775,724 | 7/1998 | Tonooka et al. ............. 280/728.2 |
| 5,788,266 | 8/1998 | Rose et al. . |
| 5,788,269 | 8/1998 | Jakovski et al. . |
| 5,851,023 | 12/1998 | Nagata et al. ............... 280/728.3 |
| 5,853,190 | 12/1998 | Rion et al. . |
| 5,979,929 | 11/1999 | Stanger et al. ............... 280/728.2 |
| 6,036,222 | 3/2000 | Holmes et al. ............... 280/728.2 |
| 6,056,313 | 5/2000 | Lutz et al. ................... 280/728.1 |
| 6,092,833 | 7/2000 | Nariyasu ..................... 280/728.2 |

*Primary Examiner*—Paul N. Dickson
*Assistant Examiner*—Faye M. Fleming
*Attorney, Agent, or Firm*—Sally J. Brown

[57] ABSTRACT

Featured for use in an inflatable restraint system installation is an airbag module assembly wherein the airbag cushion is joined or attached via interlocking reaction housing component parts. The invention is well suited for the use of such interlocking reaction housing component parts formed of relatively low-cost stamped steel.

27 Claims, 9 Drawing Sheets

INTERLOCKING AIRBAG ATTACHMENT AND MODULE ASSEMBLY

BACKGROUND OF THE INVENTION

This invention relates generally to inflatable passive restraint systems for use in vehicles for restraining the movement of a seated occupant such as in the event of a collision and, more particularly, to improved assemblies and methods for housing, positioning or attaching either or both a gas generator and an inflatable bag in a vehicle.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint, such as in the form of a cushion or bag, commonly referred to as an "airbag cushion." In practice, such airbag cushions are typically designed to inflate or expand with gas when the vehicle encounters a sudden deceleration, such as in the event of a collision. Such an airbag cushion may desirably deploy into a location within the vehicle between the occupant and certain parts of the vehicle interior, such as the doors, steering wheel, instrument panel or the like, to prevent or avoid the occupant from forcibly striking such parts of the vehicle interior.

Generally, it is common to utilize airbag module assemblies which include a combination or assembly of at least three basic components: 1) a cushion or airbag that is inflated with gas such as when the vehicle encounters a sudden deceleration, 2) a gas generator, also commonly referred to as an "inflator," which upon actuation serves to provide the gas used to inflate the airbag cushion, and 3) a reaction canister which typically functions as a structural housing supporting either or, typically more desirably, both the inflator and the airbag cushion while providing a mounting base for installation of the assembly in a vehicle and directing inflation gases resulting from the inflator into an associated airbag cushion.

Such reaction canister housing structures are typically in the form of an open-mouthed container, formed with a body portion, such as composed by one or more body parts, and with an end plate fastened at each opposed end of the container body portion. Usually, the airbag cushion, in an uninflated and folded condition, is placed into and housed within such an open-mouth reaction canister housing.

In practice, reaction canister housings which contain an airbag cushion for the protection of a front seat passenger commonly form an opening wherethrough the airbag cushion is deployable which is generally rectangular in cross sectional shaped. Normally, a passenger side airbag module assembly is mounted in or closely behind what is called the vehicle instrument panel or dashboard (hereinafter referred to as the "instrument panel"), with the airbag deployment opening of the reaction canister generally positioned planar or adjacent with the instrument panel. In the case of a driver side module installation, a corresponding driver side assembly combination is typically housed in or secured to the steering wheel.

In addition to providing a protective housing for the inflator and the airbag cushion until the time of deployment of the latter, such a housing structure can also desirably act to absorb the loads generated by or associated with the deployment of the associated airbag cushion. Typically, these loads are large and unless sufficiently and properly absorbed can cause damage to the vehicle including, in the case of a passenger side assembly, damage to the instrument panel.

Many past and present airbag module designs utilize relatively low-cost stamped steel as a basic housing component material of construction. The strength of such steel-fabricated structures can be tailored to the needs of particular system installations. For example, by varying the thickness of steel utilized therein, damage due to the impact of deployment loads can be minimized or avoided.

Emphasis on weight reduction in automobiles has, however, resulted in a strong interest in lighter weight inflatable passive restraint systems. A significant reduction in the weight of a passenger side passive restraint system can be achieved through the utilization of aluminum rather than a heavy steel material, as used in previous reaction canister housing structures. Thus, even though aluminum is generally more costly than steel, the lighter weight of aluminum has lead to the greater use thereof in reaction housing assembly and design.

Also, as shown in various commonly assigned U.S. Patents including, for example: Lauritzen et al., U.S. Pat. No. 5,332,256, issued Jul. 26, 1994; Lauritzen et al., U.S. Pat. No. 5,344,182, issued Sep. 6, 1994; Lauritzen et al., U.S. Pat. No. 5,395,133, issued Mar. 7, 1995; Lauritzen et al., U.S. Pat. No. 5,407,226, issued Apr. 18, 1995 and Lauritzen et al., U.S. Pat. No. 5,407,227, issued Apr. 18, 1995, the disclosures of which patents are incorporated herein by reference in their entirety, housing structures such as formed of aluminum are well suited for fabrication by extrusion techniques. As disclosed in such patents, such extrusion fabrication techniques permit or allow the incorporation of cushion attachment channels, slots, sleeves or the like in the housing structure, the use of which permits the attachment or holding of an airbag cushion within the housing structure while reducing or minimizing the number of required fasteners.

Thus, although sheet steel generally costs significantly less than aluminum, prior art steel-based housing designs have typically required separate components for cushion attachment, such as retainer tubes, brackets, fasteners or rods to be incorporated or used in conjunction therewith. As will be appreciated, the inclusion of such additional components can and typically do significantly increase assembly cost and weight.

In practice, the component parts of prior art inflatable restraint assemblies, e.g., the reaction canister body and corresponding end plates, even in those assemblies wherein the reaction canister housing is formed of extruded aluminum, are typically joined and held together through the use of a plurality of selected fasteners such as screws, rivets or bolts. For example, a selected fastener is typically passed through fastener holes which have been preformed in the respective parts to be fastened together. Such fastener holes commonly take the form of screw channels, such as formed during extrusion processing or otherwise, in or along the reaction canister body. Further, it is relatively common for reaction canister assemblies to rely on the inclusion and use of a plurality of fasteners in order for the reaction canister assembly to maintain needed or desired structural stability upon deployment of the associated airbag cushion, particularly at or near the chute or mouth portion of the reaction canister assembly wherethrough, upon proper actuation, the airbag cushion is deployed and the impact of the deployment forces can be especially pronounced.

The manufacture and production of assemblies that utilize multiple fasteners typically require additional production or process machinery and associated operating personnel. For example, facilities for the production of such assemblies which require multiple fasteners commonly include multiple fixture devices to effect and maintain proper fastener hole alignment for insertion of a fastener as well as a selected form or forms of driver devices in order to drive each fastener into the corresponding fastener hole alignment. Such additional production steps may undesirably slow the assembly process and increase the costs associated with such assemblies.

Furthermore, each fastener is an entity in and of itself with each such fastener needing to be secured and tightened to a specific torque, thereby complicating the assembly process. Also, in order to better ensure safe and proper operation of an airbag module assembly, the component parts of the assembly and typically including each fastener, as well as the particulars of each such component, is desirably recorded and tracked. Such recording and tracking operations, however, can become undesirably complicated and burdensome as the number of component parts required for a particular assembly design is increased. In view thereof, airbag module assemblies are generally preferably designed to minimize the number of component parts used therein.

In contrast to extruded housing designs, steel-based designs typically require costly multiple spot welds or the use of mechanical joining techniques to construct the general module housing structure. Further, one or more costly plating or coating operations is commonly required following such spot weld joinder.

To make vehicular inflatable restraint systems more affordable and thus the benefits attendant the installation of such systems more widely realizable, airbag module suppliers and manufacturers are faced with the ongoing mission to reduce and minimize costs.

In view of the above, there is a need and a demand for an airbag module assembly design which reduces or minimizes costs such as by one or more of the following:

1) permitting the more widespread use of low-cost stamped steel rather than aluminum housings, 2) permitting or facilitating fast and/or simplified assembly of such module assemblies or subassemblies such as by permitting airbag cushion attachment without requiring the use of numerous separate fastener components, by avoiding the need for costly spot welds or mechanical joining methods to construct a module housing of stamped steel and by avoiding the need for post-spot welding plating or coating operations, 3) better ensuring the secure attachment of an airbag cushion in an associated housing device, and 4) permitting the more widespread common use of assembly or housing sections or portions in various module or assembly designs.

SUMMARY OF THE INVENTION

A general object of the invention is to provide an improved airbag module assembly and method for attaching an inflatable cushion to a reaction housing assembly.

A more specific objective of the invention is to overcome one or more of the problems described above.

The general object of the invention can be attained, at least in part, through an airbag module assembly which includes an inflatable cushion and a reaction housing adapted to house the inflatable cushion. The cushion includes at least one attachment aperture. The reaction housing includes a base member and at least one side wall joinable therewith. One of the base member and the at least one side wall includes at least one projection corresponding to the attachment aperture. The other of the base member and the at least one side wall includes at least one attachment opening corresponding to the at least one projection and wherethrough the at least one projection is passed in interlocking joinder. The at least one projection is passed through the attachment aperture to secure the cushion between the base member and the at least one side wall.

The prior art fails to provide an airbag module assembly and method for attaching an inflatable cushion to a reaction housing assembly which: 1) permits the more widespread use of low-cost stamped steel rather than aluminum housings, 2) permits or facilitates fast and/or easy assembly of such module assemblies or subassemblies such as by permitting airbag cushion attachment without requiring the use of numerous separate fastener components and/or by avoiding the need for costly spot welds or mechanical joining methods to construct a module housing of stamped steel and by avoiding the need for post spot welding plating or coating operations, 3) better ensures the secure attachment of an airbag cushion in an associated housing device and 4) permits the more widespread common use of assembly or housing sections or portions in various module or assembly designs.

The invention further comprehends an improved passenger side airbag module assembly. The module assembly includes an inflatable passenger side airbag cushion having a gas inlet opening. The module assembly also includes a generally elongated cylindrical passenger side inflator having oppositely spaced first and second ends with a main axis extending therebetween. Upon actuation, the inflator is adapted to provide inflation gas to inflate the airbag cushion. The module assembly further includes a passenger side reaction housing formed of stamped steel. The reaction housing is adapted to house both the inflator and the inflatable airbag cushion in stored conditions.

In accordance with one embodiment of the invention, the airbag cushion includes a plurality of spaced apart attachment apertures adjacent the cushion gas inlet opening. The reaction housing is free of welds and includes a base member having first and second spaced apart elongated sides and first and second opposite ends. Each of the first and second sides includes a free end having a plurality of spaced apart attachment openings.

The reaction housing also includes a first elongated side wall having a base end which includes a plurality of spaced apart attachment projections corresponding to the spaced apart attachment openings of the first side of the base member. In the module assembly, each first side wall attachment projection is passed through a corresponding cushion attachment aperture and base member first side attachment opening in interlocking joinder to secure the airbag cushion between the base member and the first side wall.

The reaction housing also includes a second elongated side wall having a base end which includes a plurality of spaced apart attachment projections corresponding to the spaced apart attachment openings of the second side of the base member. In the module assembly, each second side wall attachment projection is passed through a corresponding cushion attachment aperture and base member second side attachment opening in interlocking joinder to secure the airbag cushion between the base member and the second side wall.

The reaction housing further includes first and second end closures joined to a respectively associated opposite end of the base member. Each of the first and second end closures includes a generally planar portion having first and second sections. The first sections of the first and second end closures together with the base member serve to at least in part define a first volume adapted to receive the inflator. The second sections of the first and second end closures together with the first and second side walls serve to at least in part define a second volume adapted to normally store the airbag cushion.

The invention still further comprehends a method for attaching an inflatable cushion having a gas inlet opening to a reaction housing assembly. In accordance with one embodiment of the invention, one such method involves passing at least one projection from a first reaction housing side wall through a first cushion attachment aperture adjacent the cushion gas inlet opening, a first attachment hole in a locking member underlying the first cushion attachment aperture and a first attachment opening in a reaction housing base member underlying the locking member first attachment hole. The locking member is then moved and secured to an assembled position with the at least one side wall projection locked into position within the first attachment opening of the reaction housing base member.

As used herein, references to the relative placement or positioning of assembly components or parts as being "upper," "lower," "above," "below" and the like are to be understood to generally refer to such placement or positioning illustrated in the respective drawings. It will be understood, however, that the illustrated components or parts may themselves have any appropriately selected orientation, as may be desired.

Other objects and advantages will be apparent to those skilled in the art from the following detailed description taken in conjunction with the appended claims and drawings.

DETAILED DESCRIPTION OF THE INVENTION

The present invention, as is described in more detail below, provides an improved airbag module assembly for use in inflatable passive restraint systems such as suited for use in vehicles for restraining the movement of a seated occupant in the event of a collision. More particularly, the invention provides airbag module assemblies as well as associated attachment and joinder techniques such as may desirably reduce the costs of airbag modules and the assembly and manufacture thereof such as through one or more of the following: 1) reducing component costs, 2) tailoring module design to permit or facilitate fast and/or easy assembly and 3) reducing tooling costs associated with module manufacture and/or assembly.

While the invention is described below with particular reference to a passenger side airbag module assembly for automotive vehicles including vans, pick-up trucks, and particularly automobiles, it is to be understood that the invention also has applicability not only with other types or kinds of vehicles including, for example, airplanes, but also can, if desired, be used with other types or kinds of airbag module assemblies for automotive vehicles including, for example, driver side and side impact airbag assemblies. With respect to automotive vehicles it will also be appreciated that due to usual physical differences between passenger, side impact and driver side airbag module assemblies, including the typical difference in size with passenger side airbags generally being much larger than those used in side impact and driver side assemblies, the invention has particular initial utility in passenger side airbag module assemblies.

Figure 1:
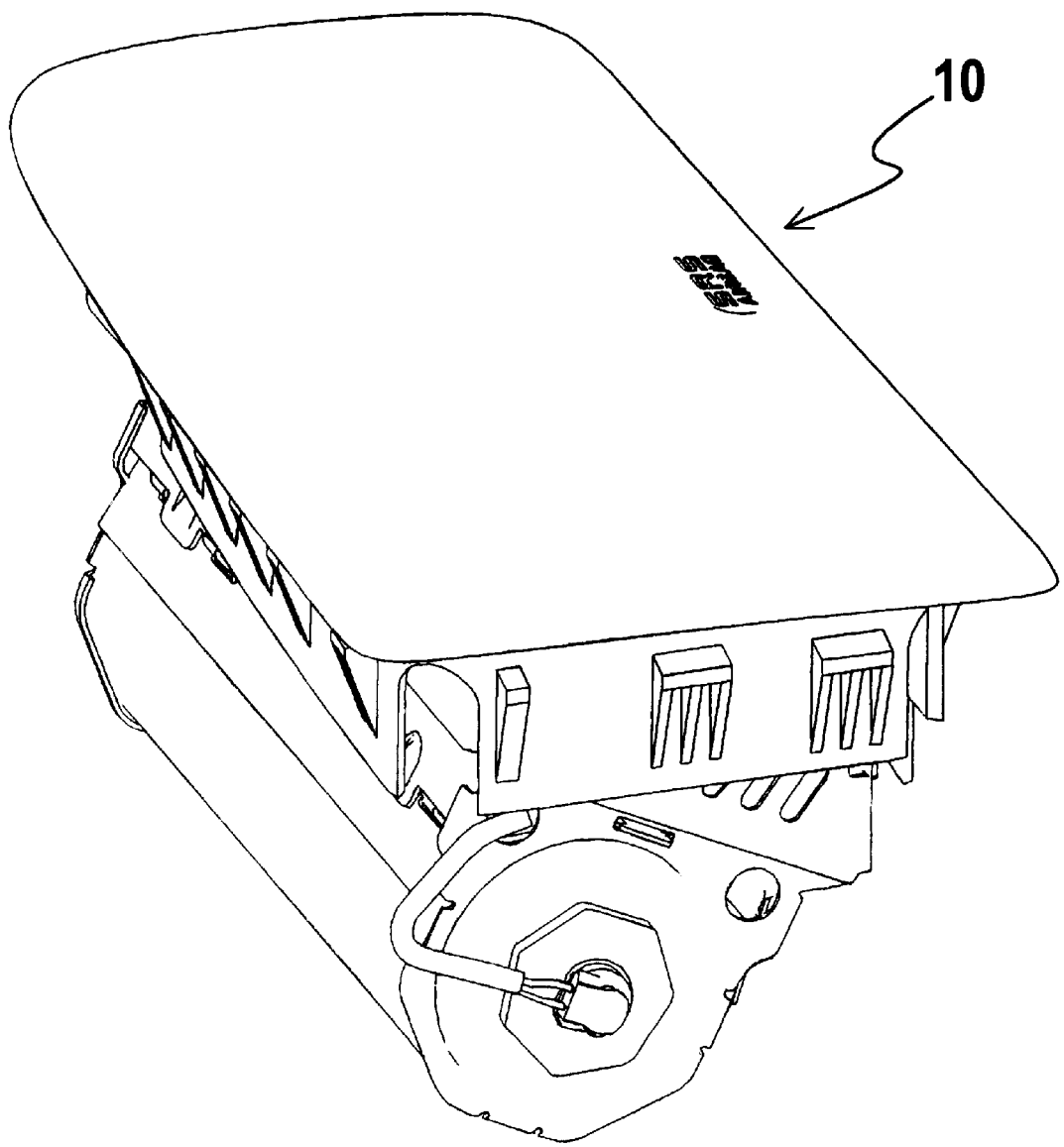
FIG. 1 is a perspective view of an airbag module assembly in accordance with one embodiment of the invention.
Figure 2:
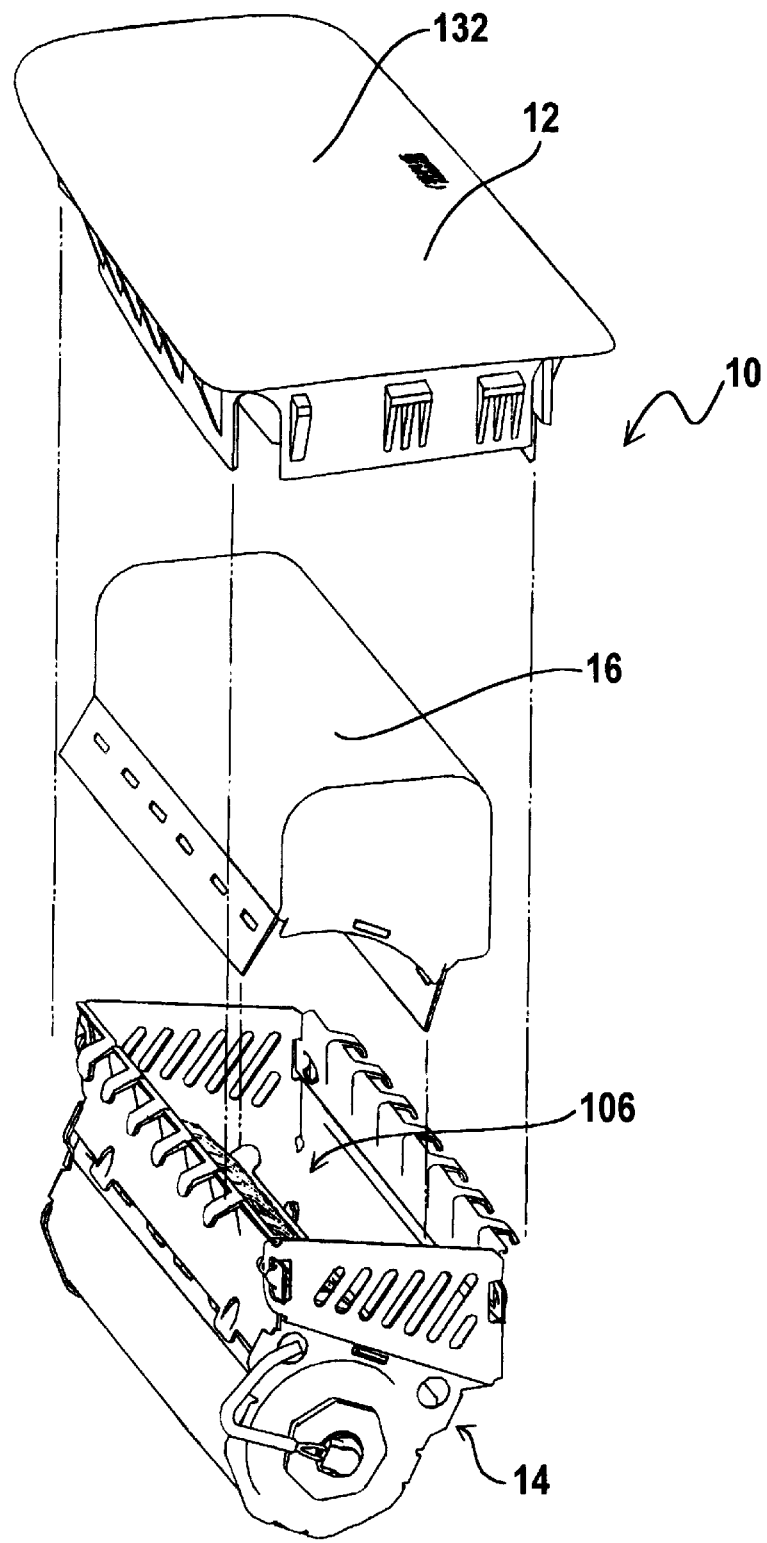
FIG. 2 is a simplified partially exploded perspective view of the airbag module assembly of FIG. I wherein the module cover is shown in exploded position relative to a module subassembly. To facilitate illustration and comprehension, the airbag cushion is shown unattached relative to the module subassembly and cover.
Figure 3:
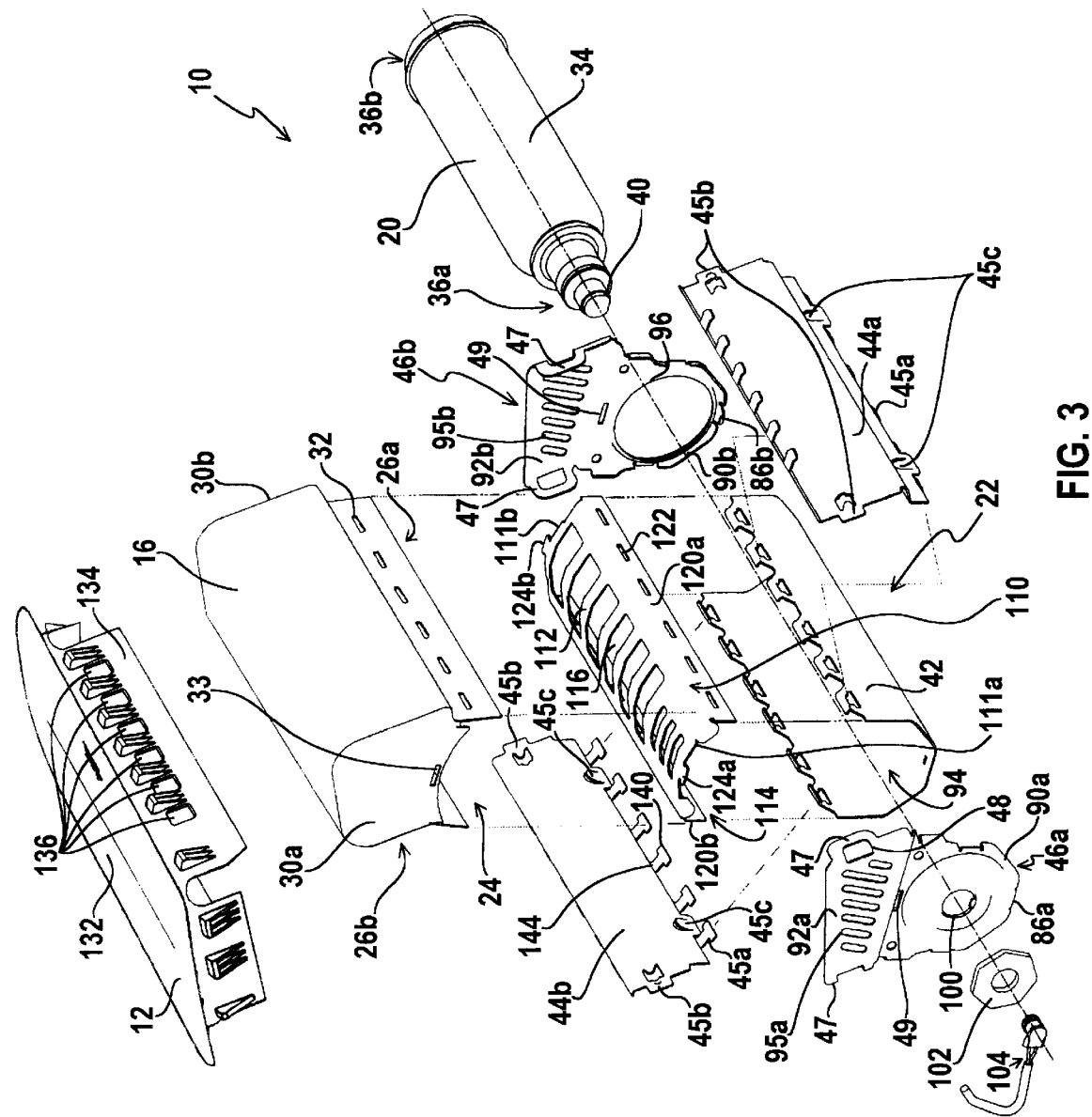
FIG. 3 is an exploded perspective view of the airbag module assembly of FIG. 1.

FIGS. 1–3 illustrates an airbag module assembly, generally designated by the reference numeral 10, in accordance with one embodiment of the invention. It is to be understood that in the practice of the invention, such an airbag module assembly is commonly housed in or secured to any appropriate cooperating portion of the vehicle. In the case of a passenger side module installation, such an assembly is normally housed in what is alternatively commonly referred to as the instrument panel (not shown) of the vehicle opposite the passenger seat. In the case of a driver side module installation, a corresponding assembly is typically housed in or secured to the steering wheel. In the case of a side impact module installation, a corresponding assembly can be housed in the seat, door, roof or side portion of a vehicle, such as adjacent to a vehicle occupant sought to be protected.

In FIG. 2, the airbag module assembly 10 is illustrated in a simplified partially exploded perspective view. More specifically, the airbag module assembly 10 includes a module cover 12 shown in exploded position relative to a module subassembly 14. To facilitate illustration and comprehension, the associated inflatable airbag cushion 16 is shown unattached relative to the module subassembly 14 and the module cover 12. As will be described in greater detail below and in accordance with a preferred embodiment of the invention, the inflatable cushion 16 is desirably attached, connected or otherwise joined in the module assembly 10 by the interlocking joinder of certain component parts thereof.

The airbag module assembly 10 is a generally self-contained unit. As shown in greater detail in FIG. 3, the primary components of the airbag module assembly 10 include the module cover 12, the inflatable airbag cushion 16, an inflatable restraint system inflator 20 and a reaction canister or housing such as in the form of a reaction housing assembly 22.

The inflatable cushion 16 includes a gas inlet opening 24, as is known in the art. In the illustrated embodiment, the inflatable cushion gas inlet opening 24 is generally rectangular in cross sectional shape. If desired, inlet openings of other shapes such as openings having circular, oval, oblong, square, etc., cross sectional shapes can be used. At the inlet opening 24, the inflatable cushion 16 has or forms a pair of elongated longitudinal sides 26a and 26b, respectively, and a pair of opposed lateral sides 30a and 30b, respectively. Along the longitudinal sides 26a and 26b, adjacent the inlet opening 24, the airbag cushion 16 includes a plurality of longitudinally spaced apart attachment apertures 32. Along the lateral sides 30a and 30b, also adjacent the inlet opening 24, the airbag cushion 16 may desirably additionally include end attachment apertures 33. The use of the attachment apertures 32 and 33 will be described in greater detail below. The inflatable cushion 16 can be formed of various airbag materials such as are known in the art. For example, the inflatable cushion 16 can be formed of a woven material or fabric, such as of nylon.

The inflator 20 is generally elongated and cylindrical in shape. Upon actuation, the inflator 20 is adapted to provide gas used to inflate the inflatable airbag cushion 16. The inflator 20 includes a chamber portion 34 and first and second end portions 36a and 36b, respectively. As shown, the inflator chamber portion 34 may desirably have the general form of a tube. The inflator 20 is an end discharge inflator which discharges inflation gas from one end therefrom, e.g., the end 36a. It will be appreciated, however, that the invention in its broader application and practice is not so limited. For example, the invention can, if desired, be practiced in conjunction with an inflator having gas exit vents or ports spaced along the circumference of the inflator chamber and arranged along the length thereof. The inflator end 36a also includes a threaded stud 40, such as is common to such inflator devices.

Figure 4:
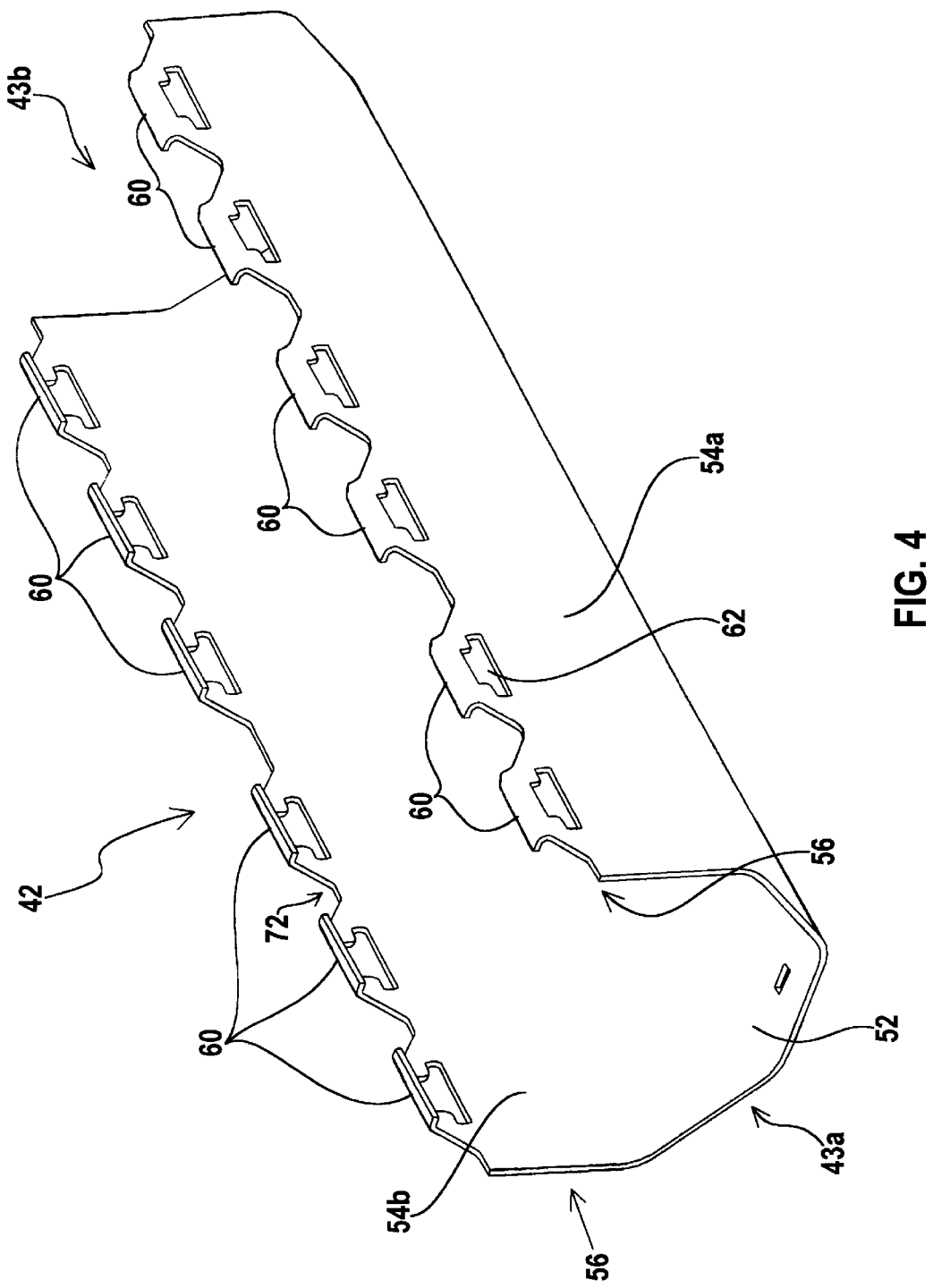
FIG. 4 is a perspective view of a reaction housing base member used in the airbag module assembly of FIGS. 1–3.
Figure 5:
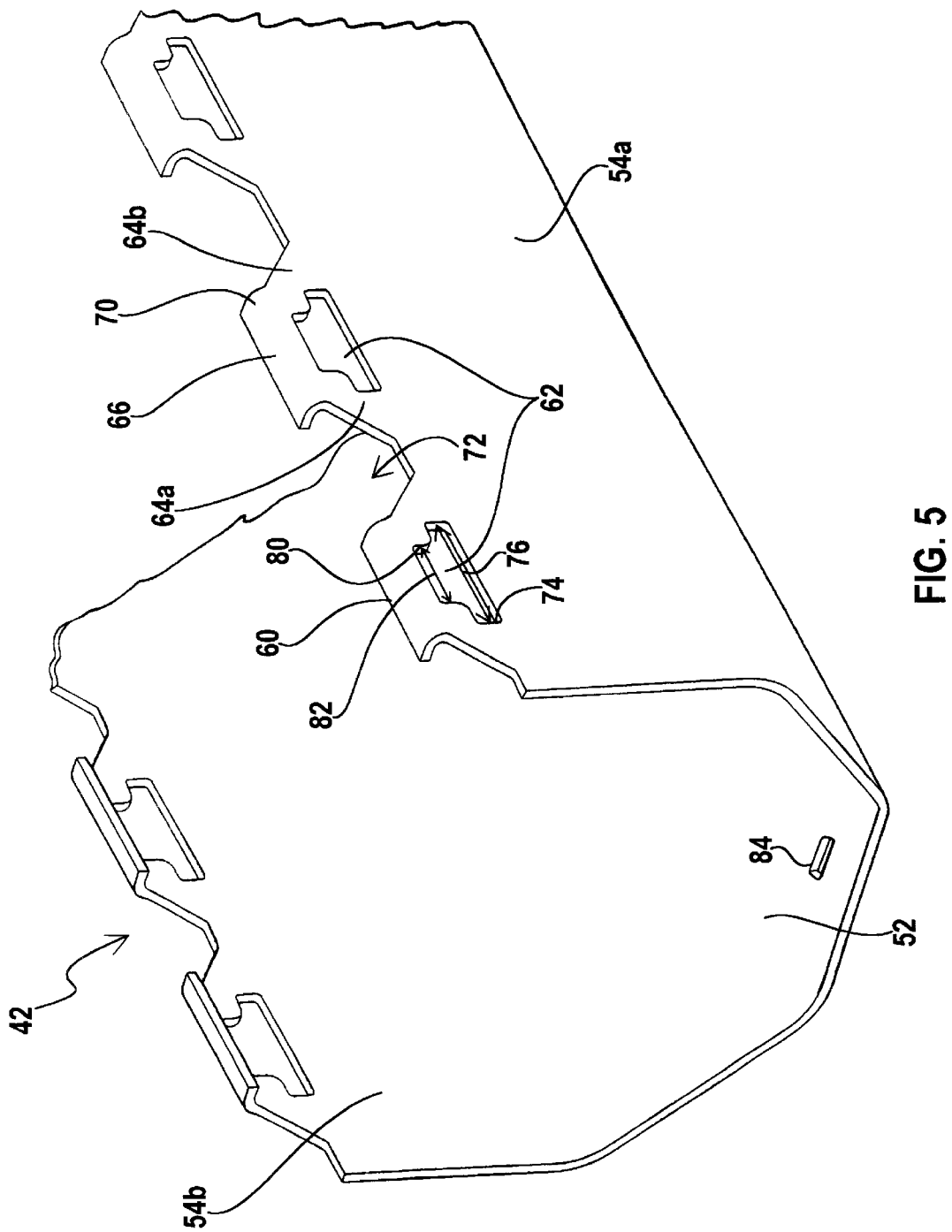
FIG. 5 is an enlarged fragmentary perspective view of the reaction housing base member shown in FIG. 4.

The reaction housing assembly 22 includes a base member 42, shown in greater detail in FIGS. 4 and 5. As shown in FIG. 4, the base member 42 has a first end 43a and an opposed second end 43b with a longitudinal length extending therebetween generally corresponding to the length of the associated inflator device 20.

Returning to FIG. 3, the reaction housing assembly 22 also includes first and second elongated side walls, 44a and 44b, respectively. As described in greater detail below, a particular feature of at least certain preferred embodiments of the invention relates to an interlocking joinder of at least certain component parts of the reaction housing assembly 22 such as may desirably serve to secure the associated inflatable cushion 16 therein. In particular, at least one and desirably both of the side walls 44a and 44b may form such an interlocking joinder with the base member 42. To that end, each of the side walls 44a and 44b include at least one and preferably a plurality of longitudinally spaced apart projections 45a extending from the lower longitudinal length of the base end thereof.

As described in greater detail below, each of the side walls 44a and 44b additionally includes a projection 45b extending from each opposed lateral side thereof as well as at least one and preferably at least two longitudinally spaced apart spring mounting tabs 45c such as also positioned along the lower longitudinal length of the base end thereof.

As will be appreciated, such first and second side walls can be of the same or different design, shape, size, form or the like, herein encompassed by the term "geometric shape or size." As will be appreciated, the use of such a module assembly having or including such first and second end walls of different geometric shape or size can be particularly desired in certain installations. For example, the incorporation and use of a module assembly having or including such first and second end walls of different geometric shape or size may be desired in those module assemblies which incorporate irregularly shaped airbag cushions or those module from which the associated airbag cushion is required to deploy in a particular manner requiring such a non-uniformly shaped housing.

The reaction housing assembly 22 further includes first and second end closures, 46a and 46b, respectively. In the illustrated reaction housing assembly 22, the base member 42, the first and second side walls 44a and 44b and the first and second end closures 46a and 46b are adapted to be attached, joined or otherwise secured such that the reaction housing assembly 22 is adapted to house both the inflatable airbag cushion 16 and the inflator 20.

The end closures 46a and 46b, respectively, include a pair of spaced generally perpendicularly extending wing sections 47. The end closure wing sections 47 include attachment openings 48 wherethrough the side wall projections 45b are respectively passed such as to desirably form or result in a first interlocking joinder of the side wall 44a with the end closure 46a and a second interlocking joinder of the side wall 44b with the end closure 46b.

Further, the end closures 46a and 46b each also respectively include an attachment slot 49 such as may be useful in the joinder of such end closures with associated components parts of the airbag module assembly, as described in greater detail below.

Turning to FIG. 4, the base member 42 is shown in enlarged detail view. As shown the base member 42 has the general form of a long, narrow, open receptacle or trough. The base member 42 includes a center portion 52 with first and second spaced apart elongated sides, 54a and 54b, respectively, extending therefrom. Each of the sides 54a and 54b includes a free end 56 having a plurality of longitudinally spaced protrusions 60 extending therefrom. Each of the protrusions 60 includes a specially shaped or formed attachment opening 62, also sometimes referred to as a "T slot."

As shown, two or more of the protrusions 60 and the associated attachment openings 62 on either or both of the sides 54a and 54b may be non-uniformly, differently or otherwise irregularly spaced such as to facilitate proper assembly. More particularly, the utilization of such differently spaced protrusions and attachment apertures can help ensure that orientation specific components are properly orientated upon the incorporation thereof into a particular assembly. For example, a particular airbag cushion may, upon deployment, desirably assume an irregular shape such as with either or both specific upper and lower portions. In accordance with the invention, utilization of differently spaced protrusions and attachment apertures can serve to ensure that the airbag cushion is incorporated into the assembly with such upper and lower portions properly orientated.

As perhaps best appreciated by reference to FIG. 5, the protrusions 60 each include a pair of leg portions 64a and 64b, respectively, and a shoulder portion 66 such as spans and joins a corresponding pair of leg portions 64a and 64b. The shoulder portion 66, as shown, can desirably include an angled section 70 such as may serve to provide increased mass and strength in a compact form such as may be desired to better ensure assembly stability upon actuation. As will be appreciated, two or more of the attachment openings 62 on either or both the sides 54a and 54b can be formed in a single continuous protrusion, such as to simplify manufacture. For example, if desired all of the attachment apertures on either or both the sides can be formed in one continuous protrusion extending along a respective side free end. It is to be understood, however, that assembly inclusion of such continuous extending protrusions may act to undesirably increase assembly weight. Thus, in accordance with one preferred embodiment of the invention, undesired protrusion mass between adjacent attachment apertures is avoided, cut away, deleted or otherwise not included, such as signified by the reference numeral 72, shown in FIG. 5.

As identified above, the protrusions 60 include specially shaped or formed attachment openings or T-slots 62. While the significance of the so shaped or formed attachment apertures will be described in greater detail below, it is significant to note that the attachment openings 62, as shown in FIG. 5, include a first portion 74 of a first elongated width 76 and a second portion 80 of a second elongated width 82. In the illustrated embodiment, the first portion 74 is situated below the second portion 80 and has an elongated width 76 which is greater than the elongated width 82, such as to generally assume the form of an inverted letter "T."

The base member center portion 52 also includes a base slot 84 adjacent each opposed end 43*a* and 43*b* (not shown), respectively. As shown in FIG. 3, each of the end closures 46*a* and 46*b* includes a locking finger 86*a* and 86*b*, respectively. The locking fingers 86*a* and 86*b*, respectively, are desirably adapted to engage with the base slot 84 in the corresponding opposed end of the base member 42 such as to facilitate assembly. For example, the engagement between such a locking finger and an associated base slot can facilitate handling and maintenance of proper alignment of the respective end closure with the base member until such time as the inflator is finally installed to complete the airbag module assembly.

As shown in FIG. 3, each of the end closures 46*a* and 46*b*, respectively, includes generally planar portion first or lower section 90*a* and 90*b*, respectively, and second or upper section 92*a* and 92*b*, respectively. The end closure lower sections 90*a* and 90*b* cooperate in register with the base member opposite ends 43*a* and 43*b*, respectively, to at least in part define a first volume 94 (sometimes referred to as an inflator storage "volume" or "cavity") adapted to receive the inflator 20.

Either or both the end closure upper sections 92*a* and 92*b* may, if desired and as shown, include a series of slots 95*a* and 95*b*, respectively. The inclusion of such slots or the like may be desired to increase or improve the yield of the assembly or components thereof to direct impact, with such increased yield commonly referred to as "softening." As will be appreciated, such increased or improved yield or softening can be desirable in various circumstances as such a reaction housing assembly is normally positioned or placed behind the instrument panel of a vehicle. Consequently, the edges of such a reaction housing assembly can be within one inch, and sometimes closer, to the back surface of the instrument panel. Thus, in the event of a low speed accident without deployment of the associated airbag cushion, the head or other body part of an oppositely seated passenger may impact the instrument panel and drive against the reaction housing assembly. By increasing or improving the yield or softening of the assembly or components thereof to direct impact, the possibility of injury as a result of such contact with the instrument panel can be reduced or minimized.

As shown, the slots 95*a* and 95*b* are of a generally elongated form and can be desirably aligned and arranged parallel with the likely direction of head impact of an oppositely seated passenger. As will be appreciated by those skilled in the art and guided by the teachings herein provided, other forms, shapes and arrangements of softening slots or openings can be utilized or desired to satisfy the particular requirements of a specific installation.

In order to permit the inflator 20 to be inserted into the airbag module assembly 10 as a latter step or operation in the assembly process, a circular opening 96 is provided in the lower section 90*b* of the second end closure 46*b*. The size of the opening 96 is such as to allow the inflator end portion 36*a* to be inserted therethrough and to then fit in mating engagement about the inflator end portion 36*b*. The lower section 90*a* of the first end closure 46*a* is provided with a smaller keyed slot opening 100 with which the threaded stud 40 projecting from the inflator end portion 36*a* fits in mating engagement.

The module assembly 10 includes a nut 102 for further securing the inflator 20 within the reaction housing assembly 22. As described more fully below and in accordance with certain preferred embodiments of the invention, such an inflator fastener is advantageously the only separate fastener required in the subject assembly.

The module assembly additionally includes a leadwire, such as designated by the reference numeral 104, joined in actuation relationship with the inflator device 20 such as to permit desired signal activation of the assembly 10.

In the constructed assembly, the nut 102 is placed on the stud 40 such as to desirably axially compress the end closures 46*a* and 46*b* to the respective opposite ends 43*a* and 43*b* of the base member 42. In this way, the inflator 20 serves as a structural tension member within the assembled airbag module assembly 10.

Similarly, the end closure second sections 92*a* and 92*b* together with the first and second side walls 44*a* and 44*b* at least in part desirably define a second volume 106 (sometimes referred to as an airbag cushion storage "volume" or "cavity") adapted to normally store the inflatable cushion 16, as perhaps best seen by reference to FIG. 2.

The airbag module assembly 10 further includes a locking member 110. The locking member 110 includes opposite, generally parallel extending lateral ends 111*a* and 111*b*, respectively, with a central portion 112 generally extending therebetween. In the illustrated embodiment, the central portion 112 is generally rectangular in cross sectional and has a generally curved profile 114 such as may desirably correspond to the tubular chamber portion 34 of the associated inflator 20 such as to facilitate compact assembly design. As will be appreciated by those skilled in the art and guided by the teachings herein provided, appropriate alternative shapes and forms of locking members can, if desired, be used or employed.

In accordance with one preferred embodiment of the invention and as described in greater detail below, the locking member 110 desirably serves to mechanically lock each of the side wall projections 45*a* in a respective associated attachment opening, hole and/or aperture.

The locking member may, however, additionally serve one or more additional functions or purposes. For example, in the illustrated embodiment, the locking member 110 also advantageously serves as a structural tie spanning between the base member sides 54*a* and 54*b*. The inclusion and presence of such a structural tie can permit the resulting assembly to better withstand or absorb the various loads such as generated by or associated with the deployment of the associated airbag cushion. As a result, collateral damage to the vehicle, such as damage to the instrument panel in the case of deployment of a typically positioned passenger side assembly, can be minimized or avoided.

Further, another additional function or purpose for the locking member 110 may be to separate the inflator storage volume 94 and the inflatable cushion storage volume 106.

In addition, the locking member in the illustrated embodiment additionally serves the role of a module diffuser. To that end, the central portion 112 of the locking member 110 includes one or more inflation gas diffusion apertures 116 wherethrough inflation gas from the inflator 20 is directed through the gas inlet opening 24 into the inflatable cushion 16. As will be appreciated and as is generally known in the art, the gas diffusion apertures 116 of a particular diffuser locking member can be appropriately sized, shaped and arranged to provide desired inflation gas flow arrangements into the associated inflatable airbag cushion 16, such as may be desired or required for particular inflatable restraint system installations.

Figure 7:
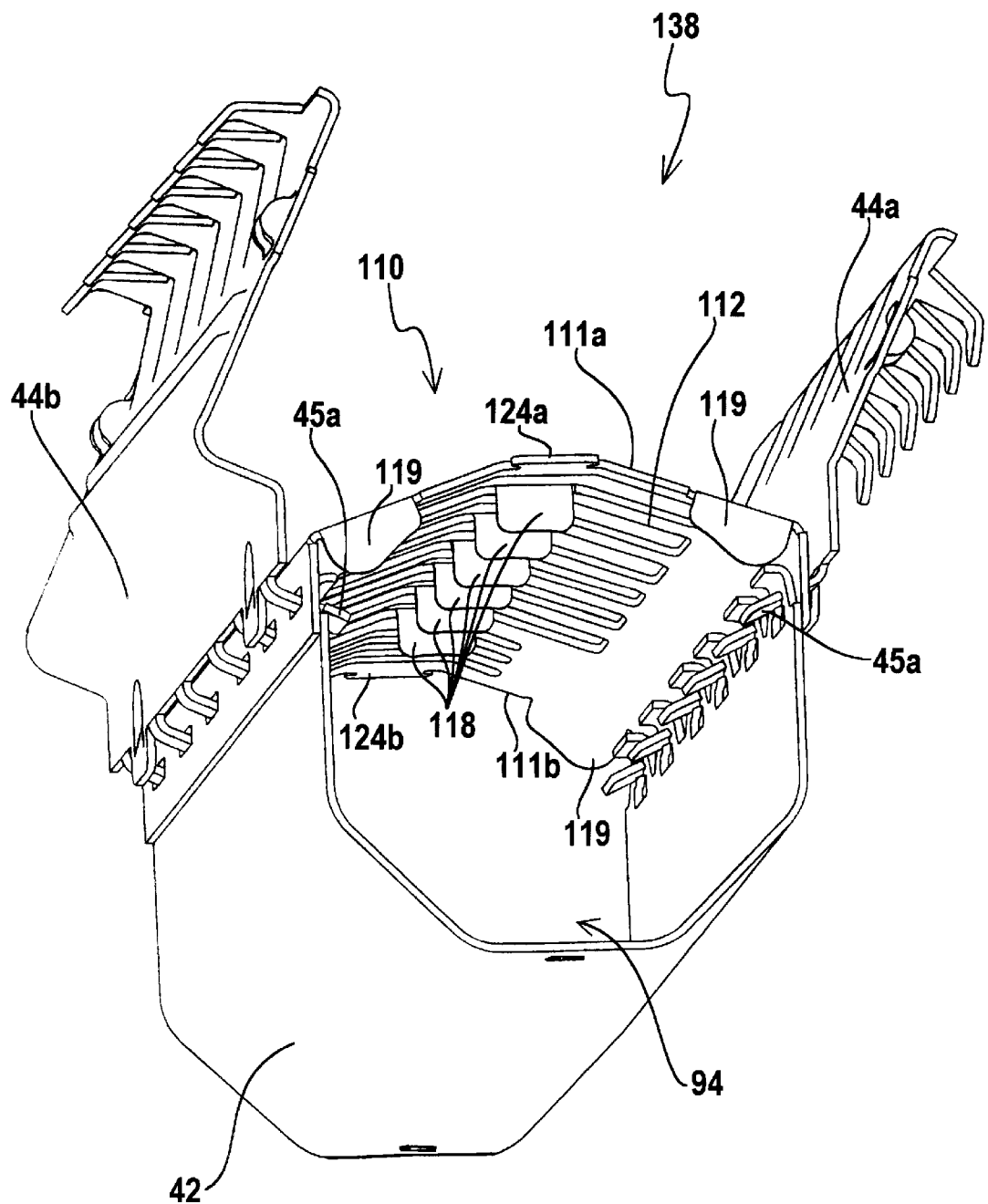
FIG. 7 is a simplified perspective view of a reaction housing subassembly of the module subassembly shown in FIGS. 2 and 6.

As perhaps best seen by reference to FIG. 7, the locking member 110 may include at least one and, more preferably, a series of spacer tabs 118 as well as one or more end tabs 119. The spacer tabs 118 extend generally perpendicularly from the central portion 112 towards the inflator storage volume 94 and are generally longitudinally spaced from one another. As will be appreciated, the inclusion of such spacer tabs can help better ensure proper arrangement and placement of the locking member relative to the associated inflator device during and upon module assembly and the use thereof. Similarly the end tabs 119 extend generally perpendicularly from locking member lateral ends 111a and 111b, respectively, towards the inflator storage volume 94. Such end tabs can desirably cooperate with the associated end closure lower section 90a and 90b (shown in FIG. 3), respectively, such as to attain, maintain and/or secure proper relative placement of the associated component parts such as during, either or preferably both, module assembly and operation. For example, the end tabs 119 can interact with the end closure lower sections 90a and 90b, respectively, and thus act as a stop on the downward movement of the locking member 110 towards the inflator storage volume 94 and thus desirably assists in attaining, maintaining and securing the locking member 110 in a locked assembled position.

Returning to FIG. 3, the locking member 110 also includes first and second opposite elongated sides 120a and 120b. Each of the locking member sides 120a and 120b includes a plurality of longitudinally spaced apart attachment holes, generally designated by the reference numeral 122, and the use of which is below described in greater detail. The locking member central portion 112 also includes, oppositely extending from each of the lateral ends 111a and 111b, respectively, a protrusion 124a and 124b, respectively. In accordance with one preferred embodiment of the invention, each of the protrusions 124a and 124b are passed through an end attachment aperture 33 of the associated airbag cushion 16 and the respective attachment slot 49 of an associated end closures 46a and 46b, respectively, furthering securing the joinder of the component parts of the assembly such as may be helpful in ensuring desired alignment of the airbag cushion inlet opening upon and during deployment.

As will be appreciated, a special feature of at least certain preferred embodiments of the invention relates to the joinder of various component parts in the airbag module assembly of the invention without requiring as many additional or distinct fastener elements as commonly needed or associated with typical airbag module assemblies.

Figure 6:
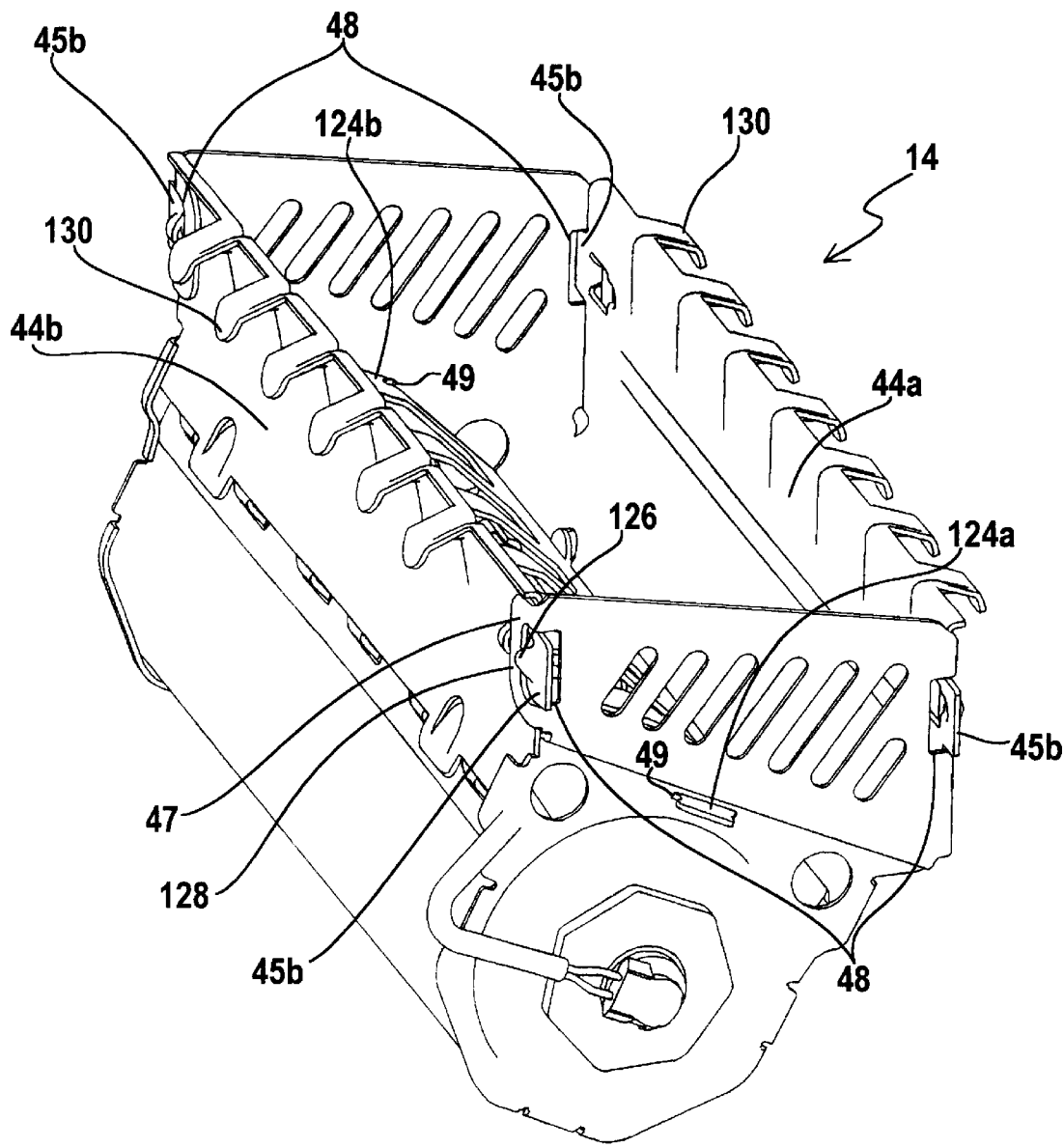
FIG. 6 is a simplified perspective view of the module subassembly shown in FIG. 2 and without the airbag cushion to facilitate illustration and comprehension.

Turning to FIG. 6, the module subassembly 14 of FIG. 2 is shown in an enlarged view. As shown, each of the side wall projections 45b is respectively passed through an associated attachment opening 48 in a respective end closure wing section 47. If desired and as shown, the side wall projections 45b may include a raised or elevated portion 126 such as may interlock with the wall 128 forming the end closure wing section surrounding the associated attachment opening 48 such as upon the occurrence of a deployment of the associated housed inflatable cushion. In accordance with one preferred embodiment, the side walls 44a and 44b desirably spring inward during attachment of the end closures 46a and 46b. The side walls 44a and 44b then desirably snap outward into a locked position upon passage of the raised or elevated side wall projection portion 126 into the associated attachment opening 48 such that the wall 128 interlocks with the associated raised or elevated side wall projection portion 126.

While various means and techniques are known and available whereby a module cover can be joined or attached to such a module subassembly, one particularly attractive cover attachment technique and associated assembly structure useful in the practice of the invention is shown and described in commonly assigned Leonard et al, U.S. Pat. No. 5,588,669, issued Dec. 31, 1996, the disclosure of which is incorporated herein in its entirety. To that end and as perhaps best seen by reference to FIG. 6, each of the side walls 44a and 44b includes a series of longitudinally spaced mounting tabs or projections 130 such as to permit and facilitate attachment of the module cover 12, shown in FIG. 3, thereto.

More specifically, the module cover 12 includes a main panel 132 which overlies the storage volume cavity 106 (shown in FIG. 2) containing the inflatable cushion 16. The main panel 132 includes a depending skirt 134. The skirt 134 is located such that it will at least overlie the outer faces of the side walls 44a and 44b of the housing when in the assembled position. The skirt 134 includes a plurality of slots 136 which are located each to receive an associated one of the mounting tabs 130 when in the assembled condition of FIG. 1. As will be appreciated, such cover attachment means and technique desirably avoids the need for additional component parts. Further, such mounting tabs and associated slots can either be simply formed during the initial fabrication of the respective components or simply added at a later point in time.

It will be understood that the broader practice of the invention is not, however, limited to particular cover attachment means and techniques and that other suitable cover attachment means and techniques such as known in the art can be used.

As identified above, a special feature of at least certain preferred embodiments of the invention relates to the joinder of various component parts in the airbag module assembly of the invention without requiring as many additional or distinct fastener elements as commonly needed or associated with typical airbag module assemblies.

Another special feature of at least certain preferred embodiments of the invention relates to inflatable airbag cushion attachment within a module assembly. More particularly, the invention provides an airbag module assembly and a method for attaching an inflatable cushion to a reaction housing assembly wherein the joinder of housing assembly components serves to secure the airbag cushion therewithin without requiring additional or distinct cushion fasteners.

Such assembly and method for attaching an inflatable cushion to a reaction housing assembly will now be described in greater detail making reference to FIGS. 7–10.

FIG. 7 illustrates a reaction housing subassembly 138 of the module subassembly shown in FIGS. 2 and 6, with the associated inflatable cushion not shown to facilitate illustration and comprehension. More specifically, FIG. 7 illustrates the interlocking joinder of the first and second elongated side walls 44a and 44b, the reaction housing base member 42 and the locking member 110 via the associated side wall projections 45a, with FIG. 8 being a simplified enlarged fragmentary detailed perspective view of the reaction housing subassembly 138.

Figure 8:
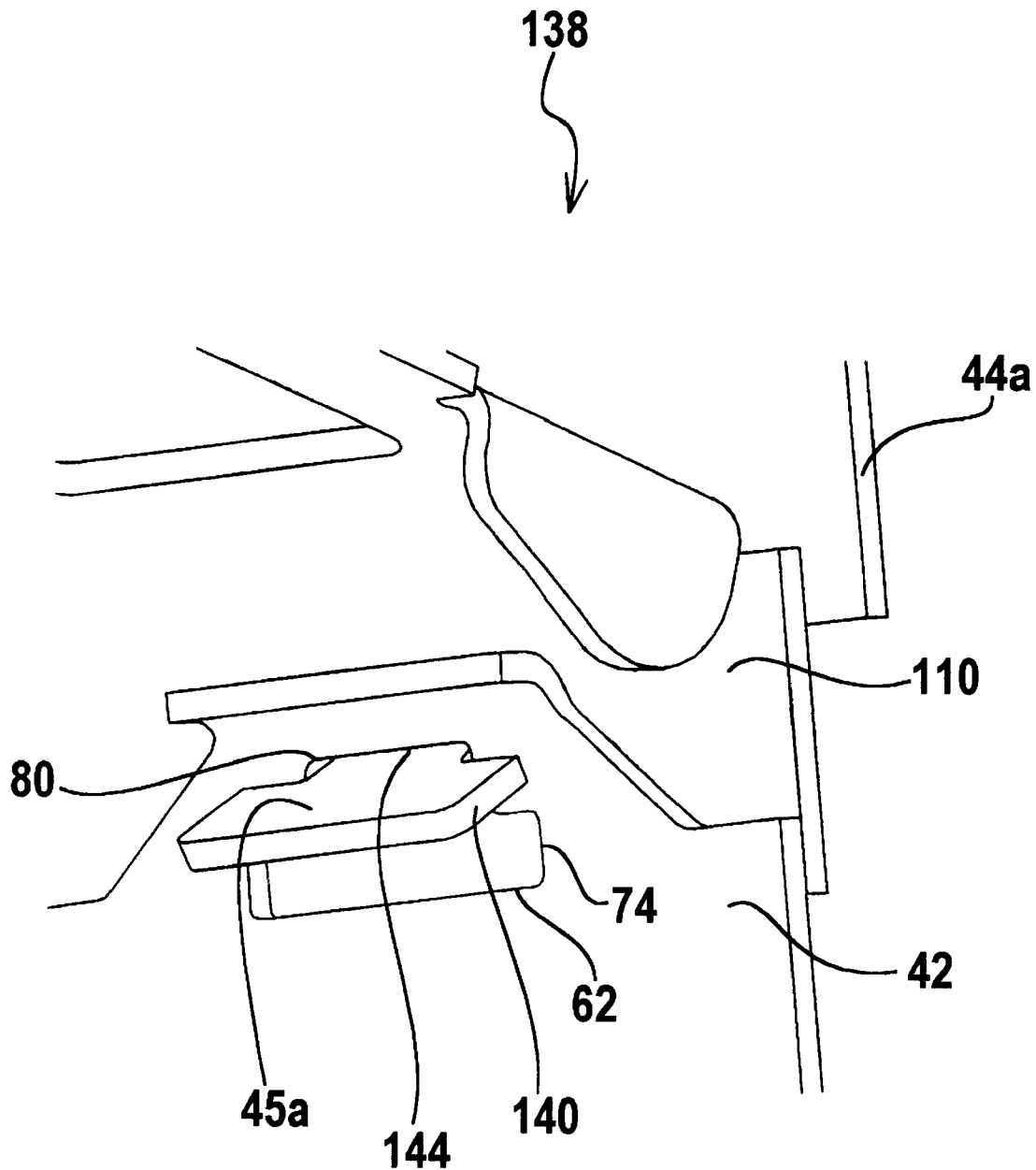
FIG. 8 is an enlarged fragmentary detailed perspective view of the simplified reaction housing subassembly shown in FIG. 7

As perhaps best seen by reference to FIGS. 3, 7 and 8, the side wall projections 45a desirably have the shape or form of a T. As shown in FIGS. 3 and 8, such a T-shaped projection 45a includes a wide base portion 140 and a comparatively more narrow neck portion 144. As shown, such a neck portion 144 desirably joins a base portion 140 with the respective associated side wall 44a or 44b.

Figure 10:
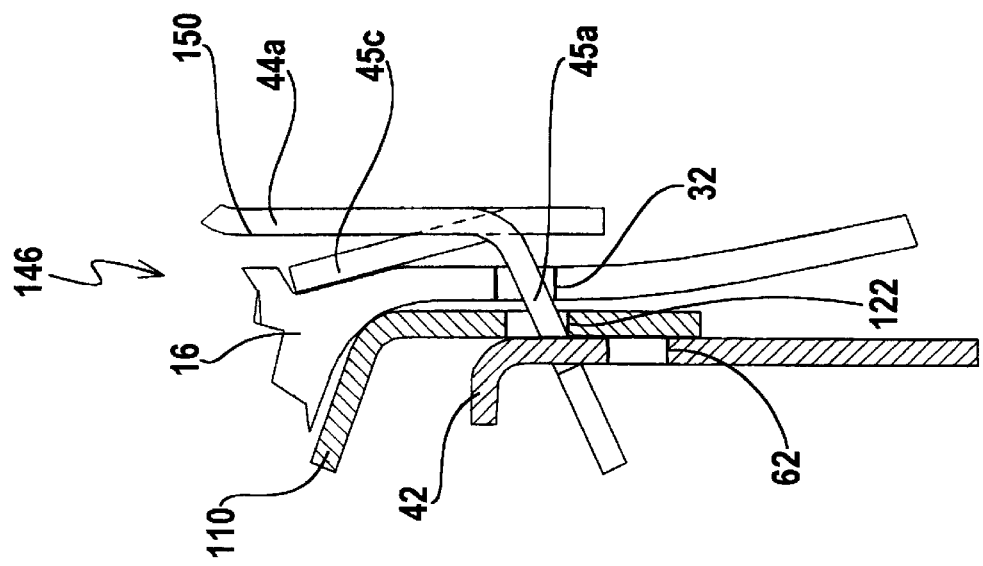
FIG. 10 is a simplified fragmentary sectional view of the airbag module subassembly of FIG. 9 in a locked condition.
Figure 9:
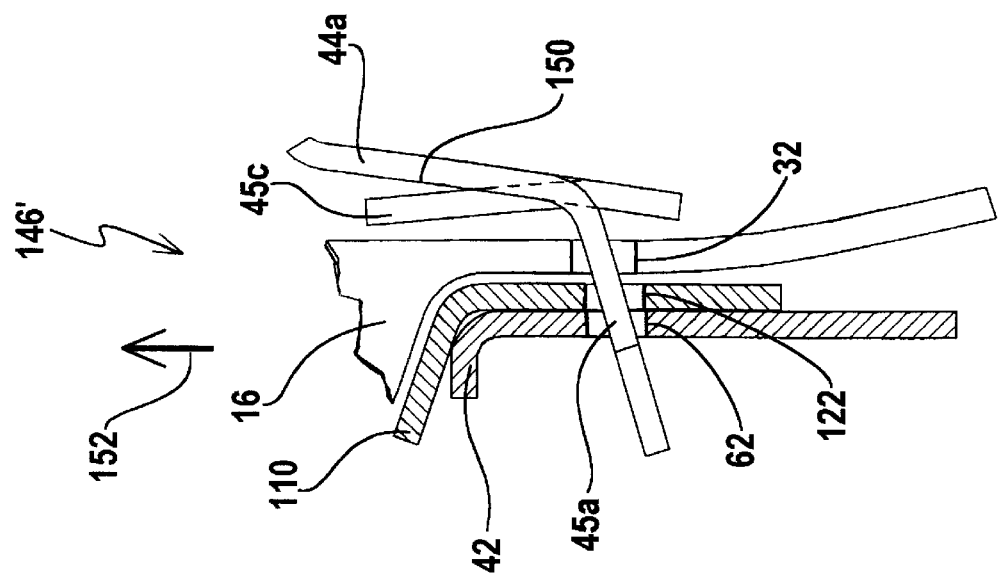
FIG. 9 is a simplified fragmentary sectional view of an airbag module subassembly in accordance with one embodiment of the invention in a pre-locked condition.

FIGS. 9 and 10 illustrate a corresponding airbag module assembly, shown in FIG. 10 in a locked condition designated by the reference numeral 146 and shown in FIG. 9 in a pre-locked condition designated by the reference 146'. The airbag module assembly includes the base member 42, the locking member 110, the inflatable cushion 16 and the side wall 44a.

Turning first to FIG. 9, an associated base member attachment opening 62, an associated locking member attachment hole 122 and an associated inflatable cushion attachment aperture 32 are shown aligned in a pre-locked condition, with an associated side wall projection 45a passed through the so aligned base member attachment opening 62, attachment hole 122 and inflatable cushion attachment aperture 32, respectively. As shown in FIG. 8, the projection base portion 140 can be passed through the wider portion 74 of the base member attachment opening 62.

As will be appreciated, such a pre-locked assembly can be arrived at by various process steps. Thus, it is to be understood that the broader practice of the invention is not limited by the specific sequence of steps by which the respective attachment holes, apertures and openings are aligned. For example, an associated base member attachment opening 62, an associated locking member attachment hole 122 and an associated inflatable cushion attachment aperture 32 can be aligned in the illustrated pre-locked condition. Then a corresponding associated side wall projection 45a can be passed through the so aligned base member attachment opening 62, attachment hole 122 and inflatable cushion attachment aperture 32, respectively.

Alternatively, the base member 42 and the locking member 110 can be joined or combined to form a first subassembly wherein the associated corresponding base member attachment openings 62 and locking member attachment holes 122 are aligned. Similarly, the projections 45a of the side wall 44a can be passed through the respective corresponding inflatable cushion apertures 32 to form a second subassembly. These projections 45a can then be passed through the aligned associated corresponding base member attachment openings 62 and locking member attachment holes 122 of such a first subassembly.

Other specific process steps for arriving at such a pre-locked assembly will be apparent to those skilled in the art and guided by the teachings herein provided and are herein encompassed.

As shown in FIG. 9, in the pre-locked assembly condition 146', the generally planar attachment flange 150 of the side wall 44a generally angles away from the inflatable cushion 16. Further the side wall mounting tab 45c does not force-fully interact with the inflatable cushion 16. The locking member 110 is subsequently moved to a locked position. For example, the locking member 110 is moved into a locked positioned such as by being moved upward, in the direction of the arrow 152, shown in FIG. 9, resulting in the locked assembly 146, shown in FIG. 10.

When in such locked position, the projection neck portion 144 is fit within the narrow width portion 80 of the base member attachment opening 62, as shown in FIG. 8. As described above, the end closures 46a and 46b are then interlocked with the assembly 146 and as may desirably assist in attaining, maintaining and securing the locking member 110 in a locked assembled position. For example, the side wall projections 45b are passed through the corresponding end closure wing section attachment openings 48 such as to desirably form or result in an interlocking joinder of the side walls 44a and 44b with the end closures 46a and 46b. The locking member protrusions 124a and 124b are each passed through a corresponding airbag cushion end attachment aperture 33 and end closure attachment slot 49 such as to further secure the joinder of the component parts of the assembly. Also, the end closure locking fingers 86a and 86b are desirably engaged with a corresponding base member slot 84 such as to facilitate assembly.

As described above, the end closure lower sections 90a and 90b cooperate in register with the base member opposite ends 43a and 43b, respectively, to at least in part define the inflator storage volume 94 adapted to receive the inflator 20. The inflator 20 can be inserted into the airbag module assembly 10 as a latter step or operation in the assembly process such as via the second end closure circular opening 96. The size of the opening 96 is such as to allow the inflator end portion 36a to be inserted therethrough and to then fit in mating engagement about the inflator end portion 36b. In turn, the inflator threaded stud 46 fits in mating engagement the first end closure keyed slot opening 100. The nut 102 can then be placed on the stud 40 such as to desirably axially compress the end closures 46a and 46b to the respective opposite ends 43a and 43b of the base member 42. In this way, the inflator 20 serves as a structural tension member within the assembled airbag module assembly 10.

In the locked position shown in FIGS. 8 and 10, the side wall projections are mechanically locked in place within the assembly such as to prevent unintended disassembly. As shown in FIG. 10, in the locked assembly condition 146, the generally planar attachment flange 150 of the side wall 44a is generally aligned in parallel with the associated base member side 54a and locking member side 120a.

Further, the side wall spring mounting tab 45c can desirably serve as a limit or stop to the movement of the side wall 44a. More specifically, such spring mounting tabs can serve as an assembly aid such as by limiting the movement of the associated side wall in the direction of the inflatable cushion. For example and as shown, the spring mounting tab 45c can act to compress the inflatable cushion 16 against the locking member 110. As will be appreciated, such side wall spring mounting tabs can also desirably assist in reducing or minimizing rattle or other undesired vibrational noises by the assembly such as once installed in a vehicle.

As described above, the invention provides an interlocking airbag attachment and module assembly that desirably serves to maintain housing structural stability. Further, such interlocking arrangement is desirably such that deployment pressures and inflatable cushion attachment loading desirably serve to increase the interlocking relationship of the various component parts. Thus, the invention provides an improved assembly structure and method for attaching an inflatable cushion while reducing or minimizing the need or use of various discrete fasteners or multiple welds.

In particular, at least certain of the embodiments of the invention incorporate or utilize a movable member (e.g., such as the locking member 110 in the above-described module assembly 10) to lock certain of the joined assembly components in final assembly relative position. As will further be appreciated, such resulting interlocking can desirably help avoid unintended or otherwise undesired disassembly.

Further, assemblies and methods of inflatable cushion attachment in accordance with the invention are a significant improvement over current designs and methods as the assemblies and methods of the invention desirably reduce and preferably eliminate the need for spot welds or other secondary joining or attachment operations to complete the basic assembly. As will be appreciated, the avoidance of the use of spot welds eliminates potential concerns regarding spot weld quality as well as permitting the use of pre-coated materials, e.g., steel, thus reducing material and manufacturing costs.

In addition, assemblies and methods of inflatable cushion attachment in accordance with the invention such as whereby the cushion is attached via the interlocking of reaction housing sidewalls with an associated base member advantageously avoids the need or use for airbag cushion retaining rings or the like as well as fasteners such as required or used therewith. As will be appreciated, such avoidance can desirably simplify manufacture and assembly as well as the costs associated therewith.

Also, the invention more easily permits reaction housing sections such as one or more base member and side walls to be commonly used in multiple module programs thus reducing program tooling and design costs.

It is also to be appreciated that assemblies of the invention can provide greater design flexibility than otherwise normally available in high production assembly. More specifically, one or more of the assembly component parts, such as either or both the sidewalls and the locking member, can be specifically designed for a particular application. For example, a diffuser locking member with a particularly designed or selected gas diffusion aperture arrangement can be used such as to specifically tailor the gas flow therethrough.

In addition, in contrast to conventionally formed or fabricated housings which typically nest relatively poorly, the simple stamp fabrication of the subject assembly components can generally facilitate desired component nesting and thus desirably reduce transportation and storage costs associated therewith.

In view of the above, it will be appreciated and understood that the invention provides an airbag module assembly design which reduces or minimizes costs such as by one or more of the following:

1) permitting the more widespread use of low-cost stamped steel rather than aluminum housings, 2) permitting or facilitating fast and/or easy assembly of such module assemblies or subassemblies such as by permitting airbag cushion attachment without requiring the use of numerous separate fastener components, by avoiding the need for costly spot welds or mechanical joining methods to construct a module housing of stamped steel and by avoiding the need for post spot welding plating or coating operations, 3) better ensuring the secure attachment of an airbag cushion in an associated housing device and 4) permitting the more widespread common use of assembly or housing sections or portions in various module or assembly designs.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an airbag module assembly including an inflatable cushion and a reaction housing adapted to house the inflatable cushion, the improvement comprising:

the cushion including at least one attachment aperture and the reaction housing including a base member and at least one side wall joinable therewith, one of said base member and said at least one side wall including at least one projection corresponding to said attachment aperture and the other of said base member and said at least one side wall including at least one attachment opening corresponding to said at least one projection and wherethrough said at least one projection is passed in interlocking joinder, with said at least one projection passed through said attachment aperture to secure the cushion between said base member and said at least one side wall.

2. The airbag module assembly of claim 1 wherein the reaction housing additionally comprises a locking member interposed between the base member and the at least one side wall, the locking member including at least one attachment hole wherethrough the at least one projection is also passed.

3. The airbag module assembly of claim 2 wherein the locking member is movable to lock the at least one projection in position.

4. The airbag module assembly of claim 2 wherein the locking member additionally comprises at least one inflation gas diffusion apertures.

5. The airbag module assembly of claim 4 wherein the locking member comprises a plurality of inflation gas diffusion apertures.

6. The airbag module assembly of claim 1 wherein the at least one side wall includes the at least one projection and the base member includes the at least one attachment opening corresponding to the at least one projection.

7. The airbag module assembly of claim 6 wherein the at least one projection is in form of a T.

8. The airbag module assembly of claim 1 wherein the reaction housing base member is of elongated shape having and the airbag module assembly includes a first and second of said side walls joinable therewith.

9. The airbag module assembly of claim 1 wherein the at least one projection is in form of a T.

10. The airbag module assembly of claim 1 additionally comprising a module cover wherein the at least one side wall additionally comprises a plurality of cover mounting tabs extending therefrom and the module cover includes a depending skirt which includes a plurality slots, each of the slots receiving an associated one of the cover mounting tabs.

11. In a passenger side airbag module assembly including an inflatable passenger side airbag cushion having a gas inlet opening, a generally elongated cylindrical passenger side inflator having oppositely spaced first and second ends with a main axis extending therebetween and which inflator upon actuation is adapted to provide inflation gas to inflate the airbag cushion and a passenger side reaction housing formed of stamped steel adapted to house both the inflator and the inflatable airbag cushion in stored conditions, the improvement comprising:

the airbag cushion including a plurality of spaced apart attachment apertures adjacent the cushion gas inlet opening, the reaction housing is free of welds and includes:

a base member having first and second spaced apart elongated sides and first and second opposite ends, each of the first and second sides including a free end having a plurality of spaced apart attachment openings, a first elongated side wall having a base end having a plurality of spaced apart attachment projections corresponding to the spaced apart attachment openings of the first side of the base member, with each of the first side wall attachment projections passed through a corresponding cushion attachment aperture and base member first side attachment opening in interlocking joinder to secure the airbag cushion between the base member and the first side wall, a second elongated side wall having a base end having a plurality of spaced apart attachment projections corresponding to the spaced apart attachment openings of the second side of the base member, with each of the second side wall attachment projections passed through a corresponding cushion attachment aperture and base member second side attachment opening in interlocking joinder to secure the airbag cushion between the base member and the second side wall, first and second end closures joined to a respectively associated opposite end of the base member with each of the first and second end closures including a generally planar portion having first and second sections, the first sections of the first and second end closures together with the base member at least in part defining a first volume adapted to receive the inflator and the second sections of the first and second end closures together with the first and second side walls at least in part defining a second volume adapted to normally store the airbag cushion.

12. The passenger side airbag module assembly of claim 11 wherein the reaction housing additionally comprises a locking member interposed between the airbag inflator and the cushion gas inlet opening, the locking member including a plurality of inflation gas diffusion apertures wherethrough inflation gas from the inflator is directed through the cushion inlet opening into the airbag cushion, the locking member including first and second opposite elongated sides each having a plurality of spaced apart attachment holes aligned with corresponding base member attachment openings such that side wall attachment projections are also passed through an associated locking member attachment hole.

13. The passenger side airbag module assembly of claim 12 wherein the locking member is movable to lock the projections in position.

14. The passenger side airbag module assembly of claim 12 wherein the locking member first and second elongated sides are spaced by first and second lateral sides, at least one of the lateral sides having an attachment extension, with the corresponding end closure including a corresponding attachment slot to receive the attachment extension to further secure the cushion to the reaction housing.

15. The passenger side airbag module assembly of claim 14 wherein the airbag cushion gas inlet opening has a rectangular cross sectional shape with first and second elongated sides corresponding to the first and second elongated sides of the base member and first and second lateral sides corresponding to the first and second end closures, with at least the first lateral side of the cushion inlet opening including adjacent thereto a second attachment aperture with the attachment extension passed therethrough into the corresponding end closure attachment slot.

16. The passenger side airbag module assembly of claim 11 wherein projection is in form of a T.

17. The passenger side airbag module assembly of claim 11 wherein side walls spring inward during end closure attachment and then snap outward into locked position.

18. The passenger side airbag module assembly of claim 11 wherein the inflator at least in part serves to compress the end closures onto the base member.

19. The passenger side airbag module assembly of claim 11 wherein the first and second side walls are of different geometric shape or size.

20. The passenger side airbag module assembly of claim 11 additionally comprising a module cover wherein the first and second side walls each additionally comprise a plurality of cover mounting tabs extending therefrom and the module cover includes a depending skirt which includes a plurality slots, each of the slots receiving an associated one of the cover mounting tabs.

21. A method for attaching an inflatable cushion having a gas inlet opening to a reaction housing assembly comprising:

passing at least at least one projection from a first reaction housing side wall through a first cushion attachment aperture adjacent the cushion gas inlet opening, a first attachment hole in a locking member underlying the first cushion attachment aperture and a first attachment opening in a reaction housing base member underlying the locking member first attachment hole and moving and securing the locking member in an assembled position with the at least one first side wall projection locked into position within the first attachment opening of the reaction housing base member.

22. The method of claim 21 wherein said securing of the locking member in the assembled position comprises joining a first end closure with the locking member, the first reaction housing, side wall and the reaction housing base member in an interlocking joinder.

23. The method of claim 22 wherein said securing of the locking, member in the assembled position comprises fastening an inflator within an inflator storage volume defined at least in part by the first end closure and the reaction housing base member.

24. The method of claim 21 wherein the first reaction housing side wall includes a plurality of the projections, wherein the method comprises:

passing each of the first reaction housing side wall projections through an associated cushion attachment aperture adjacent the cushion gas inlet opening, an associated attachment hole in the locking member underlying the associated cushion attachment aperture and an associated attachment opening in the reaction housing base member underlying the locking member associated attachment hole.

25. The method of claim 21 additionally comprising:

passing at least one projection from a second reaction housing side wall through a second cushion attachment aperture adjacent the cushion gas inlet opening, a second attachment hole in a locking member underlying the second cushion attachment aperture and a second attachment opening in a reaction housing base member underlying the locking member second attachment hole.

26. The method of claim 25 wherein said securing of the locking member in the assembled position comprises:

joining a first end closure with the locking member, the first reaction housing side wall and the reaction housing base member in a first interlocking joinder and joining a second end closure with the locking member, the second reaction housing side wall and the reaction housing base member in a second interlocking joinder.

27. The method of claim 25 wherein each of the first and second reaction housing side walls includes a plurality of the projections, wherein the method comprises:

passing each of the first reaction housing side wall projections through an associated cushion attachment aperture adjacent the cushion gas inlet opening, an associated attachment hole in the locking member underlying the associated cushion attachment aperture and an associated attachment opening in the reaction housing base member underlying the locking member associated attachment hole and passing each of the second reaction housing side wall projections through an associated cushion attachment aperture adjacent the cushion gas inlet opening, an associated attachment hole in the locking member underlying the associated cushion attachment aperture and an associated attachment opening in the reaction housing base member underlying the locking member associated attachment hole.

* * * * *